H. MUEHLHAUSEN, Jr. & J. THOMSEN.
VEHICLE SHOCK ABSORBER.
APPLICATION FILED SEPT. 23, 1908.
946,555.
Patented Jan. 18, 1910.
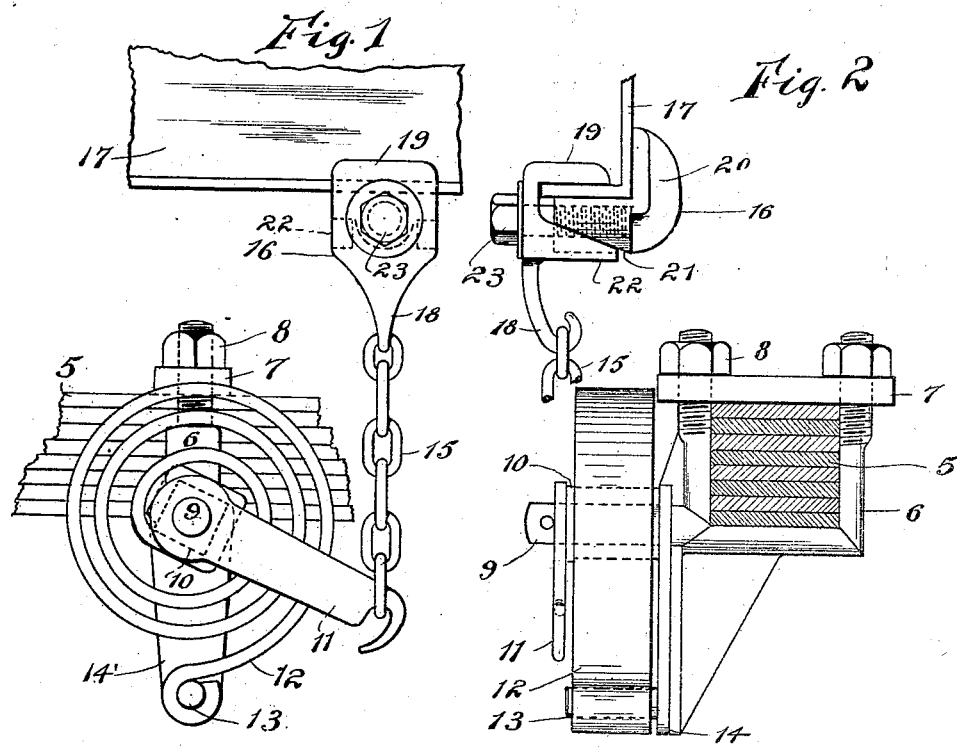
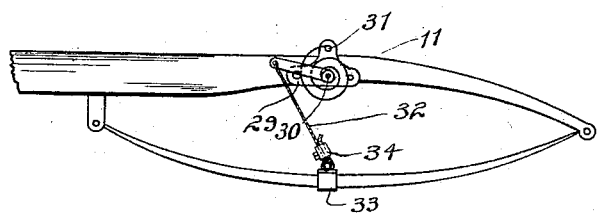
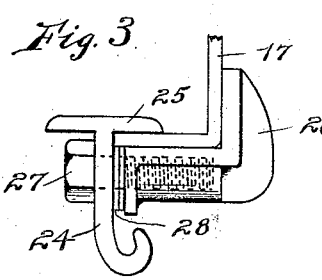
Witnesses:
Inventors,
Henry Muehlhausen Jr.
and Johannes Thomsen,
Att'y.

UNITED STATES PATENT OFFICE.

HENRY MUEHLHAUSEN, JR., AND JOHANNES THOMSEN, OF CHICAGO, ILLINOIS.

VEHICLE SHOCK-ABSORBER.

946,555.      Specification of Letters Patent.     Patented Jan. 18, 1910.

Application filed September 23, 1908. Serial No. 454,289.

*To all whom it may concern:*

Be it known that we, HENRY MUEHLHAUSEN, Jr., and JOHANNES THOMSEN, citizens of the United States, residing at Chicago, in the county of Cook and State of Illinois, have invented certain new and useful Improvements in Vehicle Shock-Absorbers, of which the following is a specification.

This invention relates to devices particularly adapted for use in connection with automobiles or other vehicles, for the purpose of lessening the recoil of the springs and thereby tending to absorb or eliminate shocks to the body of the vehicle. Its objects are to provide a device of this character which will be economical in construction, which may be readily attached to vehicles having various structural differences, and which will be exceedingly durable in operation. We attain these objects, and such other objects as will appear hereinafter, by means of the novel form of device shown in the accompanying drawings, in which—

Figure 1 is a front view of our improved shock absorber shown in connection with the spring and frame of a vehicle; Fig. 2 is a side elevation of the same; Fig. 3 is a detail showing a modified form of clamp; and Fig. 4 is a front view showing a modified arrangement of the device.

As shown in Figs. 1 and 2, 5 indicates a spring of a vehicle to which is secured a clamp 6 comprising a U-shaped bottom portion and a plate 7 which is pressed against the spring 5 by means of nuts 8. At one side of the clamp 6 is a projecting pin or axle 9, preferably formed integrally therewith, which supports a rotatable sleeve 10 having a projecting arm 11. A spiral or clock spring 12 engages, at its inner end, with the rectangular periphery of the sleeve 10, and, at its outer end, with a pin or projection 13. The pin 13 extends out from a bracket 14 which extends downwardly from the clamp 6. By having the pins or projections 9 and 13 thus arranged in fixed relation with reference to the clamp 6, the clamp may be used for vehicle springs of various sizes, without interfering with the spring bearings. That is, vehicle springs 5, with varying numbers and sizes of leaves, may be engaged by the clamp 6 within the limits of movement of the cross-bar 7.

A preferably flexible connecting device, such as a chain 15, engages with the outer end of the arm 11 which is made in the form of a hook to receive the same and extends up to a clamp 16 secured to a frame member 17 of the vehicle. In order to attach this clamp to the angular frame members, which are commonly used with many vehicles, without the necessity of boring holes through said frame member, we construct the same in the form of clamping jaws, substantially as shown in Figs. 2 or 3. As shown in Fig. 2, one of the jaws of the clamp 16 is provided with a hook 18 for engagement with the chain 15 and has an upper lip or projection 19 adapted to rest on the lower flange of the frame member 17. A second clamp member 20 is made in an angular form to engage with the outer and lower faces of the angular member 17 and is provided, on its lower side, with beveled surfaces 21 adapted to engage with correspondingly beveled projections 22 on the first clamp member. A bolt or cap-screw 23 passes freely through the first member and engages with a tapped hole in the second clamp member 20. The arrangement is such that the two clamping jaws may be readily placed in position on the frame member, and when the cap-screw is tightened it will draw them together, thereby not only clamping the lower portion of the angular frame member between the vertical faces of the jaws but also between the horizontal faces thereof, thereby insuring a rigid engagement, so that the clamp will not readily become loosened. A slight modification of such clamping device is shown in Fig. 3, in which one of the jaws 24 is provided with a hook for engagement with the connecting device, and has a T-shaped head 25 for engagement with the frame member 17, so that it may be reversed to throw the engaging end farther out from the frame member. A second jaw 26 is made in an angular form to engage with the lower and outer faces of the frame member, and is held in position by means of a cap-screw 27 which passes through the member 24, as indicated. In order to allow for the variation of the sizes of the lower flange of the frame, washers 28 are inserted between the clamp members, which may be removed or more inserted to correspond with the width of the lower leg of the angular frame member. In some instances the vehicle spring is placed directly under the frame member, at a comparatively short distance therefrom, as indicated in Fig. 4. In such case we provide a bracket 29 which is secured to the frame member and has projecting pins 30 and 31 for the coil spring. This bracket may be of the form shown in Fig. 4, or of any preferred form, such for instance as shown in Fig. 2. Instead of a chain, we have here shown a flexible cable 32 which extends down from the arm 11 and is connected to a clamp 33 on the vehicle spring. The cable 32 will not be liable to rattle, as might occur with a chain, in case of extreme movement of the vehicle body; and, as shown in the drawing, may be adjusted by pulling the free end through a clamp 34.

The operation of this device will be readily understood by one skilled in the art. When the spring 12 is placed in position, it is given a considerable amount of tension, so that the chain 15 will ordinarily be kept tight, even when the body of the vehicle moves down in compressing its supporting springs. When the body of the vehicle then starts to move relatively upward, its movement will be checked by the tension on the chain 15, which, of course, increases as the arm 11 swings upwardly and winds up the spring.

Having thus described our invention, which we do not wish to limit to the precise arrangement or form herein shown and described, what we claim and desire to secure by Letters Patent is:

1. A frame clamp for a shock absorber, comprising a pair of jaws adapted to engage with an angular frame piece, said jaws being provided with coacting beveled surfaces, and a screw connecting said jaws for forcing them together and into engagement with said frame piece.

2. In a device of the character set forth, the combination of a clamp, a projecting axle on said clamp, a sleeve engaging with said axle, an arm projecting from said sleeve, a pin projecting from said clamp, a spiral or clock spring having one end engaging with said sleeve and the opposite end engaging with said pin, beveled clamping jaws for engaging with an angular frame piece of the vehicle, a screw connecting said jaws, a hook on one of said jaws, and means connecting between said hook and the outer end of said arm, whereby the tension of said spring will be transmitted to the vehicle frame.

HENRY MUEHLHAUSEN, Jr.
JOHANNES THOMSEN.

Witnesses:
R. B. THORNE,
E. J. SHANLEY.